United States Patent [19]

Lescovich et al.

[11] Patent Number: 5,401,396

[45] Date of Patent: Mar. 28, 1995

[54] SELF-CLEANING STATIONARY BASKET STRAINER

[75] Inventors: Joseph E. Lescovich, Pittsburgh; Warren L. Huggins, Gibsonia, both of Pa.

[73] Assignee: GA Industries Inc., Cranberry Township, Butler County, Pa.

[21] Appl. No.: 908,978

[22] Filed: Jul. 6, 1992

Related U.S. Application Data

[63] Continuation-in-part of Ser. No. 748,659, Aug. 21, 1991, Pat. No. 5,183,568.

[51] Int. Cl.⁶ ..................... B01D 29/64; B01D 29/68; B01D 29/35
[52] U.S. Cl. .................... 210/108; 210/111; 210/408; 210/411; 210/413; 210/415; 209/273; 209/306
[58] Field of Search ............... 210/108, 111, 408, 411, 210/413, 415, 409, 407; 209/273, 306

[56] References Cited

U.S. PATENT DOCUMENTS

| | | |
|---|---|---|
| 2,275,958 | 3/1942 | Hagel . |
| 3,574,509 | 4/1971 | Zentis . |
| 4,315,820 | 2/1982 | Mann . |
| 4,643,828 | 2/1987 | Barzuza . |
| 4,818,402 | 4/1989 | Steiner . |
| 4,842,722 | 6/1989 | Holz ................................. 209/270 |
| 5,152,891 | 10/1992 | Netkowicz . |
| 5,183,568 | 2/1993 | Lescovich . |

FOREIGN PATENT DOCUMENTS

| | | |
|---|---|---|
| 1332661 | 6/1963 | France . |
| 2424053 | 4/1978 | France . |
| 2548047 | 7/1984 | France . |
| 4042167A1 | 7/1991 | Germany . |
| 48-86165 | 11/1973 | Japan . |
| 52-131669 | 10/1977 | Japan . |
| 3-106 | 1/1991 | Japan . |
| 2157964A | 11/1985 | United Kingdom . |

OTHER PUBLICATIONS

Patent Abstracts of Japan vol. 8 No. 180 (M-318) [1617] Aug. 18, 1984 and JP-A-59 071 999 Abstract.

*Primary Examiner*—Thomas M. Lithgow
*Attorney, Agent, or Firm*—Armstrong, Westerman, Hattori, McLeland & Naughton

[57] ABSTRACT

A self-cleaning stationary basket strainer has a housing with an inlet adjacent the top and an outlet adjacent the bottom, with a stationary strainer basket contained therein spaced from the wall of the housing. A flush discharge opening and a backwash discharge opening and provided in the closed bottom of the housing. A hollow backwash conduit is provided adjacent the inner surface of the strainer basket, adapted to move about the inner periphery thereof, and has a passage in the wall thereof communicating with a chamber in the conduit. A discharge section on the hollow backwash conduit communicates with the backwash discharge opening in the housing, the backwash discharge opening sealable when not in use. A scraper blade and extension member are provided on the hollow backwash conduit forming a channel which communicates with the passage. A rotatable brush may also be used which moves about the inner periphery of the strainer basket and brushes the inner surface of the strainer basket.

12 Claims, 4 Drawing Sheets

SELF-CLEANING STATIONARY BASKET STRAINER

CROSS-REFERENCE TO RELATED APPLICATION

This application is a continuation-in-part of application Ser. No. 748,659, filed Aug. 21, 1991, now U.S. Pat. No. 5,183,568, and is related to application Ser. No. 900,190, filed Jun. 17, 1992, (Docket No. 92089) in the names of Joseph E. Lescovich and Warren Huggins, entitled "Backwashable Self-Cleaning Strainer", and assigned to the assignee of the present application, the contents of said application incorporated by reference herein.

FIELD OF THE INVENTION

The present invention relates to a backwashable strainer apparatus having a stationary strainer basket, and more particularly to such an apparatus used to remove particulates from water that is to be used in industrial installations.

BACKGROUND OF THE INVENTION

In many industrial installations, a large supply of water is often needed for cooling, flushing, or other applications. Such a large supply of water is usually taken from a body of water, such as a river, stream, pond or other water source, which contains particulate material, such as leaves, twigs, stones and the like, that would be harmful to industrial equipment and which particulate material must be removed. In order to remove such particulates, an initial bar screen may be used to filter out the largest articles, while other particulates are fed to a straining apparatus which may be a rotary strainer containing a rotary basket screen or other device to remove particulates.

The assignee of the present invention has, for example, provided strainers which are adapted for service on a suction side of pumps to strain liquid of foreign matter, and one such device is of a motorized self-cleaning type that contains a strainer basket in a housing, which basket is motor driven. A support with spokes suspends the strainer basket in the housing, while a brush, shear knife and/or water jet device is used to clean the strainer basket sidewall. A revolving brush on the outside of the strainer basket keeps the strainer basket openings free from clogging, while a shear knife on the outside of the strainer basket shears any protruding matter from the basket as it revolves, and high pressure cleaning jets pressure clean the strainer basket as it revolves, forcing debris from the strainer basket and its openings. Applicant has also furnished a strainer that contains a removable stationary basket in a housing, the housing having a removable cover and the basket having a handle thereon for removing the basket for cleaning.

In the co-pending related application referenced to hereinbefore, a self-cleaning strainer is described having a vertically disposed housing which contains a rotatable strainer basket. A cleaning device for removing particulates from the side wall of the rotating basket includes a hollow backwash conduit in the strainer basket, the conduit having an outer wall that defines a chamber and a passage through the wall communicating with the chamber. An aperture is provided in the housing wall which communicates with the chamber of the hollow backwash conduit, and a means for sealing the aperture provided to open and close the chamber to the atmosphere outside the housing. A scraper blade and extension member, spaced therefrom, are provided on the hollow backwash conduit on either side of the passage. A rotatable brush may also be provided to further clean the inner surface of the strainer basket side wall.

It is an object of the present invention to provide a self-cleaning strainer having a stationary strainer basket therein with a backwash system for easily cleaning the wall of the strainer basket of particulate material collected on the wall.

It is another object of the present invention to provide a self-cleaning strainer having a stationary strainer basket therein and a rotatable cleaning device supported for rotation within the strainer basket to clean away particulates collected on the inner surface of the wall of the strainer basket.

SUMMARY OF THE INVENTION

A self-cleaning stationary basket strainer has a housing with an inlet adjacent the open top thereof and an outlet adjacent the closed bottom wall thereof, with a cover sealing the open top. In the bottom wall are provided a flush discharge opening that is sealable and a backwash discharge opening that is also sealable. A stationary strainer basket having a foraminous side wall, and an open top and open bottom is disposed in the housing, spaced from a side wall of the housing, such that liquid containing particulates enters the inlet and passes into the strainer basket with the liquid passing outwardly through opening in the foraminous side wall and particulates collected on the inner wall.

A cleaning device for cleaning the inner wall of the stationary strainer basket includes a hollow backwash conduit having an outer wall forming a chamber therein which is disposed adjacent the inner surface of the strainer basket and moves about the inner periphery of the strainer basket. The hollow backwash conduit has a passage through the wall thereof, facing the inner surface of the strainer basket. The chamber of the hollow backwash conduit communicates with a sealable backwash discharge opening in the bottom wall of the housing. The backwash discharge opening is opened when backwashing of the side wall of the strainer basket is effected and closed during normal operation of the strainer. Preferably, a scraper blade is provided on the hollow backwash conduit and a spaced extension member provided to form a channel therebetween which communicates with the passage through the wall of the hollow backwash conduit. At least one of said scraper blade and extension member is adjustable relative to the other to enable adjustment of the width of the channel formed therebetween, and the force of contact of the scraper blade against the inside wall of the strainer basket is also adjustable. A rotatable brush may also be provided that brushes the inner surface of the strainer basket and also moves around the inner periphery thereof.

DESCRIPTION OF THE DRAWINGS

The invention will become more readily apparent from the following description of a preferred embodiment thereof shown, by way of example only, in the accompanying drawings, where.

DETAILED DESCRIPTION

Figure 1:
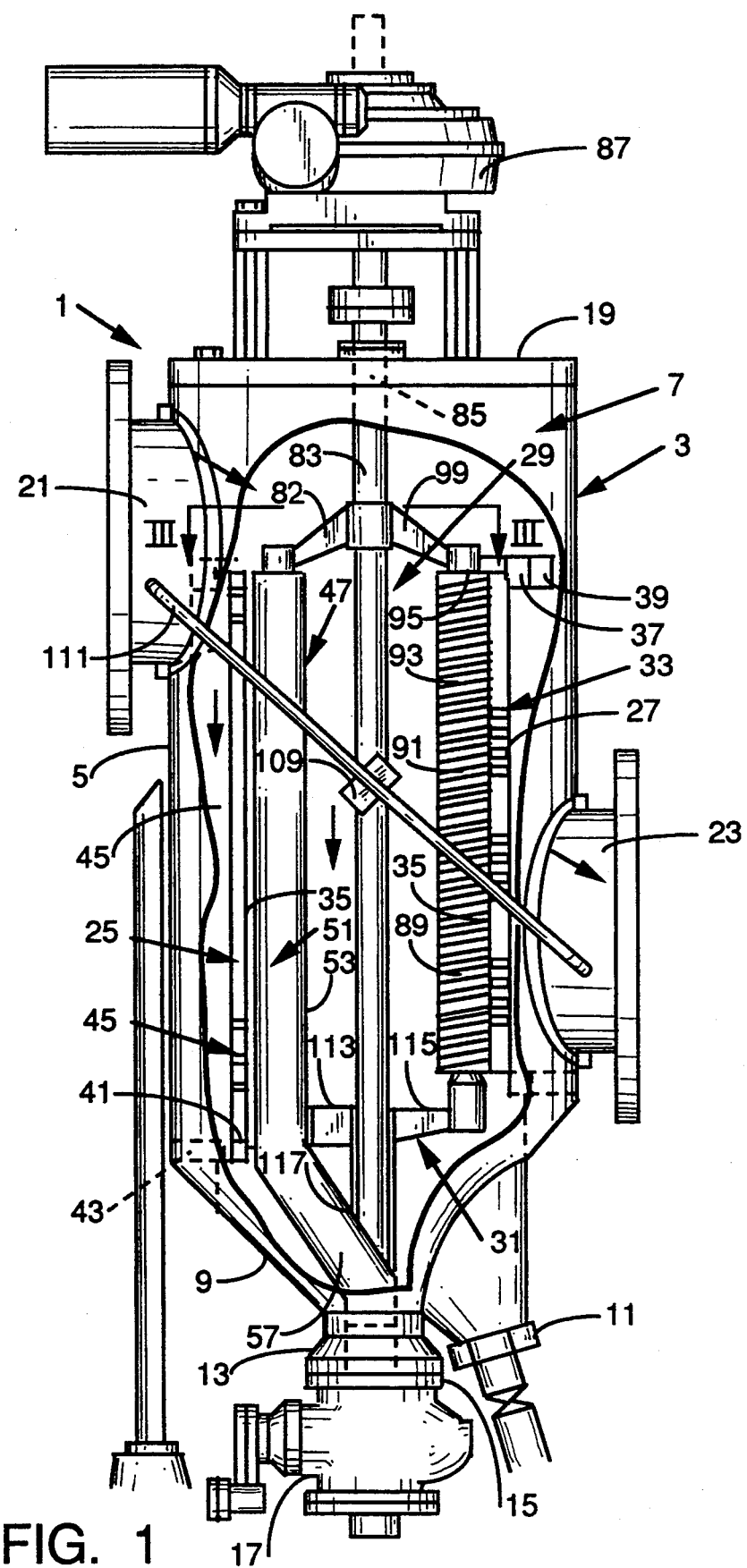
FIG. 1 is an elevational view, with the wall cut away, of the self-cleaning stationary basket strainer of the present invention.
Figure 2:
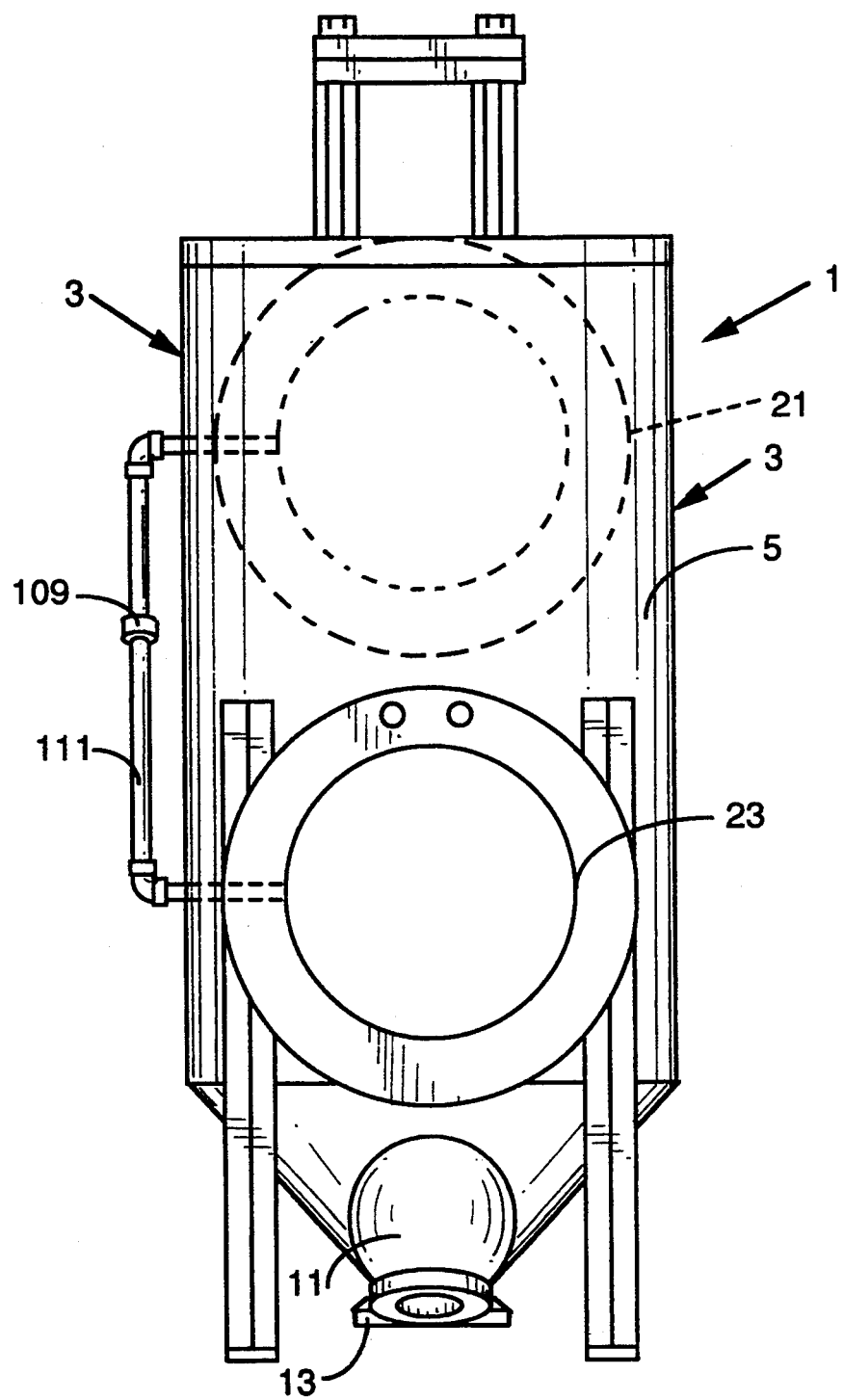
FIG. 2 is a side view of the self-cleaning stationary basket strainer of FIG. 1.

Referring now to the drawings, a self-cleaning strainer 1 of the present invention is illustrated, the strainer having a vertically disposed housing 3 which has an upstanding side wall 5, an open top 7 and a bottom wall 9. A flush discharge opening 11 and a backwash discharge opening 13 are provided in the bottom wall 9, the flush discharge opening 11 attachable to a discharge valve (not shown), such as a shear gate valve, and the backwash discharge opening 13 sealed, such as by a threaded pipe 15, threadably engaged with the bottom wall 9 of the housing 3, which pipe contains a shut-off valve 17. A cover plate 19 sealingly closes the open top 7 of the housing 3. An inlet 21 is provided in the housing side wall 5 adjacent the open top 7 for charging of liquid containing particulates to the housing 3, and an outlet 23 is also provided in the side wall 5 adjacent the bottom wall 9 for discharge from the housing 3 of clean liquid after particulates have been removed therefrom. Disposed in the housing 3 is a stationary strainer basket 25 which has a cylindrical foraminous side wall 27, an open top 29, and an open bottom 31. The foraminous side wall 27 has openings 33 therethrough such that liquid may pass through the side wall 27 while particulates will be removed from the liquid and collected on the inner surface 35 of the side wall 27. The side wall 27 of the strainer basket 25 may be formed from a mesh-like material, a perforated sheet material, a series of spaced bars, or other material forming a foraminous side wall for the stationary strainer basket 25. The stationary strainer basket 25 is provided with an upper seal 37 which cooperates with a flange 39 extending inwardly from the side wall 5, and a lower seal 41 which cooperates with a flange 43 extending inwardly from the side wall 5 to form a spacing 45 or filtrate chamber between the side wall 5 of the housing 3 and the wall 27 of the strainer basket 25. In order to assure that no restriction to flow of the liquid through the self-cleaning strainer 1 occurs, the area of the spacing 45 between the side wall 5 of the housing 3 and the cylindrical foraminous side wall 27 of a strainer basket 25 is preferably greater than the cross-sectional area of the opening of the inlet 21.

In operation of the self-cleaning strainer 1, water containing particulates is charged to the housing 3 through inlet 21 and flows, as shown by the arrows in FIG. 1, downwardly through the open top 29 of the strainer basket 25. The water is then directed through the openings 33 in the side wall 27 of the strainer basket, into the spacing 45, and clean water is discharged from the housing 3 through outlet 23. Particulates removed from the water are collected on the inner surface 35 of the side wall 27 of the strainer basket 25. The inner surface 35 of the side wall 27 of the strainer basket 25 must be periodically cleaned and a means 47 for cleaning the inner surface 35 is provided.

Figure 4:
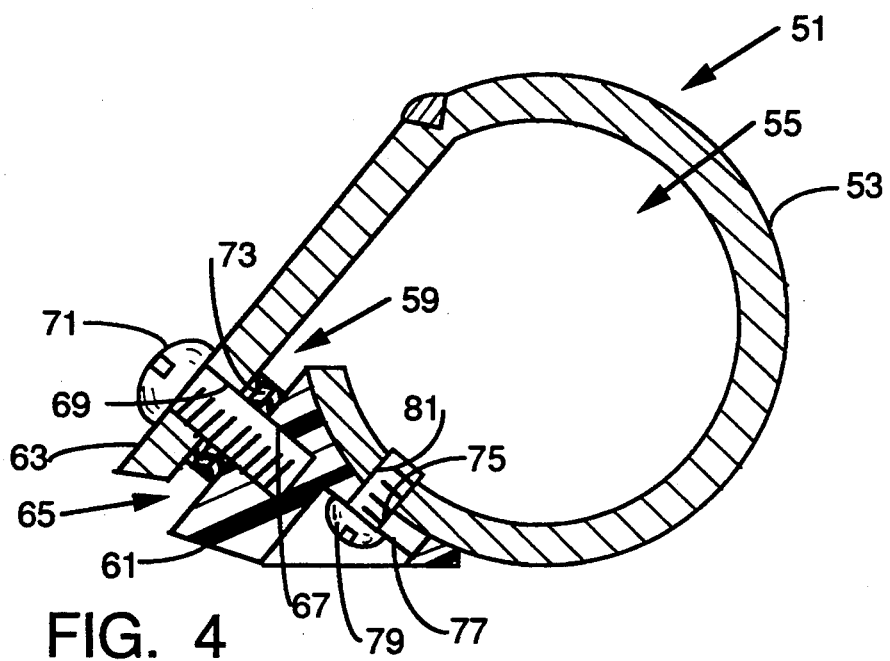
FIG. 4 is a horizontal cross-sectional view of an embodiment of the hollow backwash conduit, scraper blade and extension member of the self-cleaning stationary basket strainer of the present invention.
Figure 5:
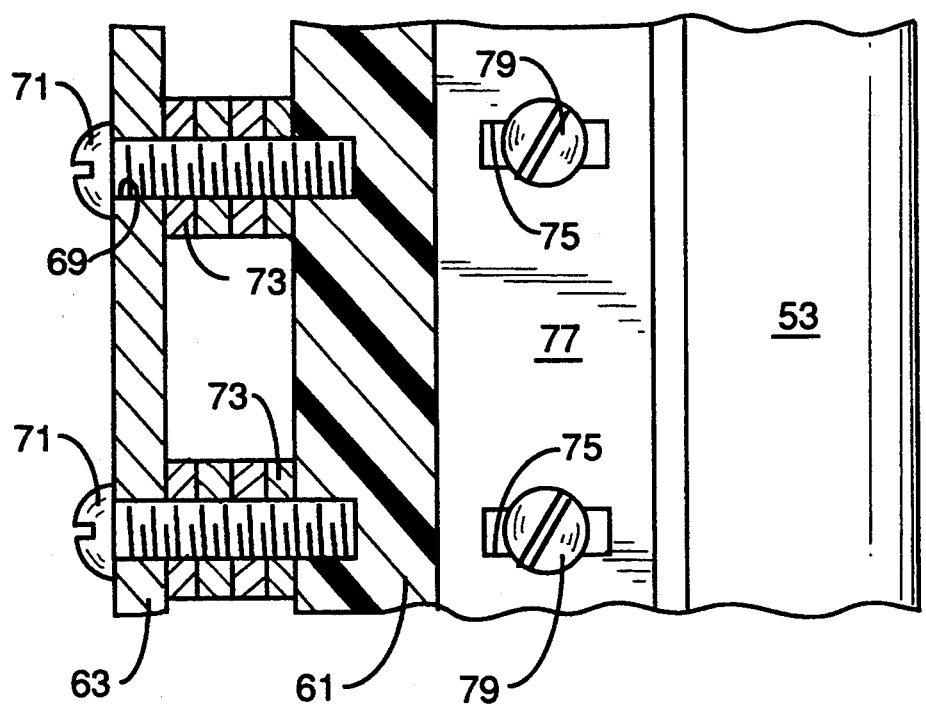
FIG. 5 is an elevational view, partly in cross-section, of a portion of the hollow backwash conduit, scraper blade and extension member shown in FIG. 4.

The means 47 for cleaning the inner surface 35 of the stationary strainer basket 25 comprises a hollow backwash conduit 51 having an outer wall 53 which defines a chamber 55 (FIG. 4), the hollow backwash conduit 51 disposed in the stationary strainer basket 25 adjacent the inner surface 35 thereof. A backwash discharge section 57 is provided on the hollow backwash conduit 51, the chamber 55 of which communicates with the backwash discharge opening 13. The hollow backwash conduit 51 preferably extends the entire length of the stationary strainer basket 25. A passage 59 is formed through the outer wall 53 of the hollow backwash conduit 51 which preferably faces the inner surface 35 of the stationary strainer basket 25 and preferably extends substantially the length of said hollow backwash conduit 51 within the strainer basket 25.

A shear member or scraper blade 61 is provided on the hollow backwash conduit 51, within the stationary strainer basket 25, on one side of the passage 59, which is positioned to contact the inner surface 35 and scrape particulate material therefrom. The scraper blade is preferably formed from a high-wear, low friction type material, such as an ultra-high molecular weight polymeric material. An extension member 63, such as a plate, is provided on the other side of the passage 59, at a position spaced from the scraper blade 61, so as to form a channel 65 therebetween, which channel 65 communicates through passage 59 with the chamber 55 in the hollow backwash conduit 51. The size of the channel 65, and thus the volume of flow of backwash water therethrough to the chamber 55 is adjustable by an adjustable securement of at least one of the scraper blade 61 and the extension member 63. For example, a threaded bore 67 may be provided in the scraper blade 61 and an aligned hole 69 through the extension member 63, with a bolt 71 passing through the hole 69 and threadedly engaged with the bore 67 to increase or decrease the width of the channel 65 between the scraper blade 61 and the extension member 63. Spacers 73, such as washers about bolts 71 are used to stabilize the extension member 63 relative to the scraper blade 61 and the number and size of spacers 73 control the width of the channel 65.

In order to provide adjustability for the scraper blade 61 relative to the surface 35, and adjustability relative to the extension member 63, a series of vertically spaced slots 75 are provided in a base 77 of the scraper blade 61, which base is flush with the wall 53 of the hollow backwash conduit, through which bolts 79 are passed and secured in threaded bores 81 in the wall 53. Loosening and tightening of the bolts 79 enable movement and securement of the scraper blade 61 in a lateral direction. This lateral adjustment also enables adjustment of the scraper blade 61 relative to the inner surface 35 the strainer basket 25 to adjust the pressure of contact of the blade against the inner surface.

The hollow backwash conduit 51 is connected to a spoke 82 that is carried by a shaft 83, that is concentrically positioned in the housing 3, the shaft 83 extending through a bearing 85 in the cover 19 of the housing 3, and rotatable by a motor 87 that is disposed on the housing 3.

During operation of the strainer 1, water containing particulates passes from inlet 21 through the open top 29 of the stationary strainer basket 25 into the confines of the strainer basket 25, with the water flowing through the foraminous side wall 27 through openings 33 and into the spacing 45 between the strainer basket 25 and the side wall 5 of the housing 3 before discharge through the outlet 23 for use. The particulate material in the water entering the strainer is collected on the inner surface 35 of the strainer basket 25 and must be periodically removed. The pressure within the confines of the strainer basket 25 and in the spacing 45 between the strainer basket 25 and the wall 5 of the housing 3 is increased due to forcing of the water therethrough. Upon opening of the valve 17 in pipe 15 attached to the backwash discharge opening 13 of the housing 3, to open flow through the pipe 15 to the outside atmosphere, a reduced pressure is formed in the chamber 55 of the hollow backwash conduit 51 relative to the spacing 45 between the strainer basket 25 and the wall 5 of the housing 3, which forces clean water from the spacing 45 back through the openings 33 in the foraminous side wall 27 of the strainer basket 25 in a flow pattern opposite that of normal operational flow. By such reversal of the normal flow pattern, particulate material collected on the inner surface 35 of the strainer basket 25 is removed and carried by water through channel 65 and passage 59, into chamber 55 of the hollow backwash conduit 51 and out of the backwash discharge conduit 13 for discharge from the strainer 1, or it may be directed into the bottom section of the housing 3 from which it is subsequently discharged through the flush discharge opening 11. The rate of flow and amount of backwash water from the strainer may be controlled by adjusting the valve 17 so as to control the flow of water from the chamber 55 of the hollow backwash conduit 51. With the motor 87 activated, the hollow backwash conduit 51 will be moved about the inside periphery of the strainer basket 25 to clean the entire inner surface 35 of the wall 27.

Figure 3:
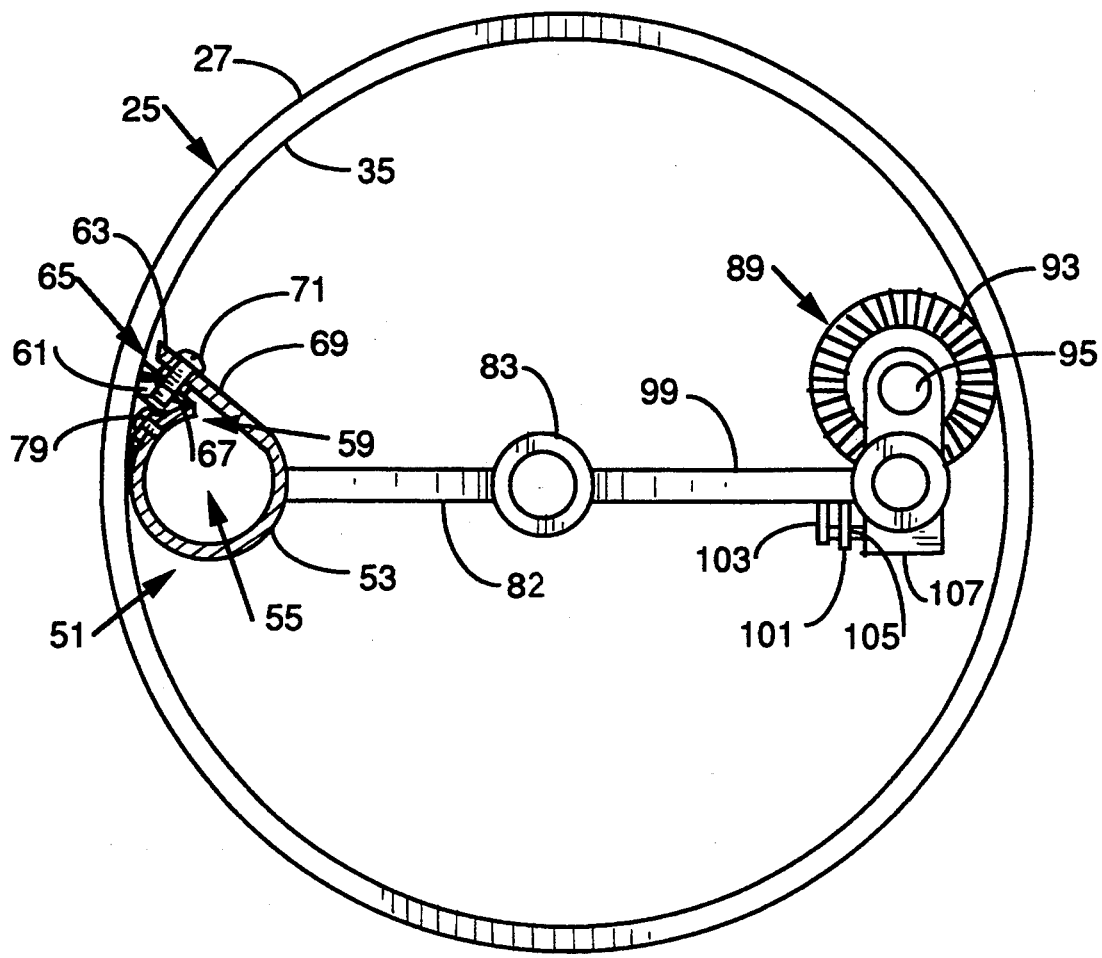
FIG. 3 is a horizontal cross-sectional view of the self-cleaning stationary basket strainer of FIG. 1 showing a hollow backwash conduit and brush.

In order to further clean the inner surface 35 of the wall 27 of strainer basket 25, a rotatable brush 89 is provided. The rotatable brush 89 has a bristled portion 91, having bristles 93 thereon, carried by a brush shaft 95 that is dependent from a further spoke 99 attached to the shaft 83, and adapted to contact the inner surface 35 of the side wall 27. The shaft 95 of the rotatable brush 89 is adjustably secured to the spoke 99 (FIG. 3) such as by use of an adjustment screw connection, using an arm 101 attached to the spoke 99, and a screw 103 which is threadedly secured in a bore 105 in the arm 101 to bear against a connection 107 of the shaft 95 to the spoke 99.

Cleaning of the self-cleaning stationary basket strainer is effected when desired, usually when a pressure drop is noted between the inlet 21 and outlet 23 of the housing 3, such as a pressure drop of about 5 pounds per square inch or more, indicating plugging of the openings 33 of the cylindrical foraminous sidewall 27 of the strainer basket 25. The pressure drop may be sensed, for example, by a pressure switch 109 contained in a conduit 111 which communicates with both the inlet 21 and outlet 23. The pressure switch is connected to motor 87 by any conventional means (not shown). When cleaning is desired, an automatic control system such as pressure switch 109 may be used to start the motor 87 which, through shaft 83, turns the spokes 82 and 99 with the attached hollow backwash conduit 51 and brush 89, such that the bristled portion 91 brushes the inner surface 35 of the sidewall 27 of the strainer basket 25. As the hollow backwash conduit 51 moves, the scraper blade 61 scrapes along the inner surface 35 to shear any fibers or other particulates clogging the openings 33 while the brush 89 brushes the surface 35. The shaft 83 may have bottom spokes 113 and 115 secured respectively to the hollow backwash conduit 51 and brush shaft 95 for stability, and may also be welded to the backwash discharge section 57 of the hollow discharge conduit, such as by welds 117 to provide further stability. The particulates scraped from the inner surface 35 by the scraper 61 will flow, with backwash water, through the channel 65 into the chamber 55 in hollow backwash conduit 51 and be discharged through backwash opening 13, while particulates brushed from the surface 35 will fall through the open bottom 31 of the strainer basket 25 for discharge through flush discharge opening 11. The flush discharge opening 11 may be open to an off-take continuously or a shear gate valve may be used to close the same when desired. If more flushing of the strainer basket and flush discharge opening 11 is desired, flush water may be charged through a flush water conduit (not shown) downwardly through the strainer basket 25. When the strainer basket 25 has been cleaned, the motor 87 is shut down and the rotation of the hollow backwash conduit 51 and brush 89 is terminated. The self cleaning strainer may then be used to clean further particulate-laden water.

A cleaning operation may also be effected without interruption of service of the strainer by simply opening a shear gate valve attached to the flush discharge opening 11.

Also, the strainer may be cleaned by temporarily taking the strainer out of service by closing a valve in a conduit leading to inlet 21, as well as a valve in a conduit leading from outlet 23 and then opening a shear gate valve attached to the flush discharge opening 11. Flush water is then charged through a flush water conduit downwardly through the strainer basket 25 which will flush out debris through the flush discharge opening 11.

The cleaning of the strainer can be effected, as above-described by use of a pressure drop activated device, by a time activated device to periodically flush out the strainer, or by a device responding to any other preferred electrical or other signal.

A control panel may be provided that cooperates with the strainer and can be programmed for any type of flushing and in response to any desired signal, so that the user has great flexibility with respect to flushing procedures and the reason for a flushing cycle. Also, the allowable time for flushing can be pre-established and programmed into a control panel. Such a programmer is not necessary to any of the above cleaning procedures, since a user may tie it into the user's own system or effect such a cleaning procedure manually or semi-automatically. Use of such a control panel, however, allows for programming and automatic cleaning to suit a particular installation.

What is claimed is:

1. A self-cleaning stationary basket strainer comprising:
    a vertically disposed housing having an upstanding side wall, an open top and a bottom wall, with an inlet in the side wall for liquid containing particulates adjacent said open top, an outlet in the side wall adjacent said bottom wall for discharge of clean liquid therefrom, a flush discharge opening in said bottom wall, and a cover plate sealingly closing the open top thereof;

a stationary strainer basket, having a cylindrical foraminous side wall with an inner surface and an open top and bottom, with openings through said cylindrical foraminous side wall for flow of liquid therethrough, disposed in said housing, spaced from said side wall of said housing and disposed below said inlet;

upper and lower seals between the upstanding side wall of said housing and the side wall of said stationary strainer basket forming a filtrate chamber between said housing and said stationary strainer basket, with said filtrate chamber communicating with said outlet in the side wall of said housing, such that liquid containing particulates entering through said inlet passes into the strainer basket and outwardly through said openings to remove said particulates, and clean liquid in said filtrate chamber is directed through said outlet;

means for cleaning the inner surface of said strainer basket to remove particulates collected thereon, said means for cleaning being rotatably mounted to move about the inner periphery of said stationary strainer basket, and including a hollow backwash conduit, said hollow backwash conduit having an outer wall defining a chamber, disposed in said stationary strainer basket adjacent the inner surface thereof, said hollow backwash conduit having an elongated passage having two sides through the outer wall thereof facing said inner surface;

a scraper blade on one side of said passage on said hollow backwash conduit, positioned to contact said inner surface and an extension member on the other side of said passage on said backwash conduit extending towards said inner surface, said scraper blade and extension member spaced from each other to form a channel therebetween communicating through said passage with the chamber of said hollow backwash conduit;

means to laterally adjust at least one of said scraper blade and said extension member relative to each other so as to adjust the width of said channel;

means for moving said means for cleaning about the inner periphery of said stationary strainer basket;

a backwash discharge opening in a wall of said housing;

a backwash discharge section on said hollow backwash conduit communicating with said backwash discharge opening; and means for closing and opening said backwash discharge opening.

2. The self-cleaning stationary basket strainer as defined in claim 1 wherein said passage through the outer wall of said hollow backwash conduit extends substantially the length of said conduit within said stationary strainer basket.

3. The self-cleaning stationary basket strainer as defined in claim 1 wherein said means for closing and opening said backwash discharge opening includes means for regulating the volume of flow of said backwash water through said hollow backwash conduit.

4. The self-cleaning stationary basket strainer as defined in claim 1 wherein said scraper blade has a base and said means to laterally adjust are provided to laterally adjust said base on said hollow backwash conduit.

5. The self-cleaning stationary basket strainer as defined in claim 1 wherein spacers are provided between said scraper blade and said extension member to stabilize the same in spaced relationship.

6. The self-cleaning stationary basket strainer as defined in claim 1 including means for varying the pressure of contact of said scraper blade on said inner surface.

7. The self-cleaning stationary basket strainer as defined in claim 1 including a rotatably mounted bristled brush and means to move said bristled brush about the inner periphery of said stationary strainer basket, said bristled brush positioned such that the bristles on the brush contact said inner surface.

8. The self-cleaning stationary basket strainer as defined in claim 7 including means for intermittently rotating said bristled brush.

9. A self-cleaning stationary basket strainer comprising:

a vertically disposed housing having an upstanding side wall, an open top and a bottom wall, with an inlet in the side wall for liquid containing particulates adjacent said open top, an outlet in the side wall adjacent said bottom wall for discharge of clean liquid therefrom, a flush discharge opening in said bottom wall, and a cover plate sealingly closing the open top thereof;

a stationary strainer basket, having a cylindrical foraminous side wall with an inner surface and an open top and bottom, with openings through said cylindrical foraminous side wall for flow of liquid therethrough, disposed in said housing, spaced from said side wall of said housing and disposed below said inlet;

upper and lower seals between the upstanding side wall of said housing and the side wall of said stationary strainer basket forming a filtrate chamber between said housing and said stationary strainer basket, with said filtrate chamber communicating with said outlet in the side wall of said housing, such that liquid containing particulates entering through said inlet passes into the strainer basket and outwardly through said openings to remove said particulates, and clean liquid in said filtrate chamber is directed through said outlet;

means for cleaning the inner surface of said strainer basket to remove particulates collected thereon, said means for cleaning being rotatably mounted to move about the inner periphery of said stationary strainer basket, and including a hollow backwash conduit, said hollow backwash conduit having an outer wall defining a chamber, disposed in said stationary strainer basket adjacent the inner surface thereof, said hollow backwash conduit having an elongated passage having two sides through the outer wall thereof facing said inner surface;

means for moving said means for cleaning about the inner periphery of said stationary strainer basket;

a scraper blade on one side of said passage of said hollow backwash conduit, positioned to contact said inner surface of the foraminous side wall of said stationary strainer basket;

an extension member on the other side of said passage of said hollow backwash conduit extending towards said inner surface, said scraper blade and extension member spaced from each other to form a channel therebetween communicating through said passage with the chamber of said hollow backwash conduit;

means for laterally adjusting at least one of said scraper blade and said extension member relative to each other so as to adjust the width of said channel;

means for laterally adjusting said scraper blade relative to the inner surface of said strainer basket so as to adjust the pressure of contact of said scraper blade against said inner surface;

a backwash discharge opening in a wall of said housing;

a backwash discharge section on said hollow backwash conduit communicating with said backwash discharge opening; and means for closing and opening said backwash discharge opening.

10. The self-cleaning stationary basket strainer as defined in claim 9 wherein said passage through the outer wall of said hollow backwash conduit extends substantially the length of said conduit within said stationary strainer basket.

11. The self-cleaning stationary basket strainer as defined in claim 9 including a rotatable bristled brush adapted to move about the inner periphery of said stationary strainer basket, positioned such that the bristles on the brush contact said inner surface.

12. The self-cleaning stationary basket strainer as defined in claim 11 wherein said bristled brush is intermittently rotatable.

* * * * *